US008827355B2

(12) United States Patent
Iwamoto et al.

(10) Patent No.: US 8,827,355 B2
(45) Date of Patent: Sep. 9, 2014

(54) VEHICLE BODY STRUCTURE

(75) Inventors: Hiroaki Iwamoto, Nagoya (JP);
Fumihiko Kishima, Kounan (JP);
Kazuya Koizumi, Iwata (JP)

(73) Assignee: Toyota Jidosha Kabushiki Kaisha,
Toyota-shi, Aichi-ken (JP)

( * ) Notice: Subject to any disclaimer, the term of this patent is extended or adjusted under 35 U.S.C. 154(b) by 0 days.

(21) Appl. No.: 13/825,134

(22) PCT Filed: Sep. 1, 2011

(86) PCT No.: PCT/JP2011/069951
§ 371 (c)(1),
(2), (4) Date: Mar. 20, 2013

(87) PCT Pub. No.: WO2013/031008
PCT Pub. Date: Mar. 7, 2013

(65) Prior Publication Data
US 2014/0159422 A1 Jun. 12, 2014

(51) Int. Cl.
*B60N 99/00* (2006.01)
*B62D 25/20* (2006.01)
*B62D 21/15* (2006.01)

(52) U.S. Cl.
CPC ............... *B62D 21/15* (2013.01); *B62D 25/20* (2013.01)
USPC ........... 296/187.08; 296/187.12; 296/193.05; 296/193.07; 296/203.03

(58) Field of Classification Search
USPC ............. 296/187.08, 187.12, 193.05, 193.06, 296/193.07, 203.03
See application file for complete search history.

(56) References Cited

U.S. PATENT DOCUMENTS

| 5,332,281 | A * | 7/1994 | Janotik et al. ............ 296/209 |
| 5,480,208 | A * | 1/1996 | Cobes et al. ............ 296/203.01 |
| 6,786,534 | B1 * | 9/2004 | Peng ...................... 296/187.08 |
| 7,001,097 | B2 * | 2/2006 | Wang et al. .................. 403/231 |
| 8,235,458 | B2 * | 8/2012 | Mori ........................ 296/193.06 |
| 8,262,152 | B2 * | 9/2012 | Okumura et al. ........ 296/193.06 |

FOREIGN PATENT DOCUMENTS

| JP | 04039171 A * | 2/1992 | ............ B62D 25/02 |
| JP | 4-35974 | 3/1992 | |
| JP | 6-27452 | 4/1994 | |
| JP | 6-99857 | 4/1994 | |
| JP | 6-321137 | 11/1994 | |
| JP | 7-61374 | 3/1995 | |
| JP | 2000-264256 | 9/2000 | |
| JP | 2006-264541 | 10/2006 | |
| JP | 2008-68720 | 3/2008 | |
| JP | 2008-279889 | 11/2008 | |
| JP | 2010-155403 | 7/2010 | |

* cited by examiner

*Primary Examiner* — Lori Lyjak
(74) *Attorney, Agent, or Firm* — Finnegan, Henderson, Farabow, Garrett & Dunner, LLP

(57) ABSTRACT

A vehicle body structure has a floor panel upper; a rocker provided so as to extend in a vehicle longitudinal direction at a vehicle transverse direction outer side of the floor panel upper, and having a rocker upper and a rocker lower that are divided in a vehicle vertical direction; a floor reinforcement provided so as to extend in the vehicle longitudinal direction at a central portion between the rocker and a tunnel portion formed at a vehicle transverse direction central portion of the floor panel upper, and disposed at a vehicle rear side of a front side member; and an intermediate reinforcement lower provided so as to extend in the vehicle longitudinal direction between the rocker and the floor reinforcement, disposed at a vehicle lower side of the floor panel upper, and formed integrally with the rocker lower via a flange portion.

9 Claims, 9 Drawing Sheets

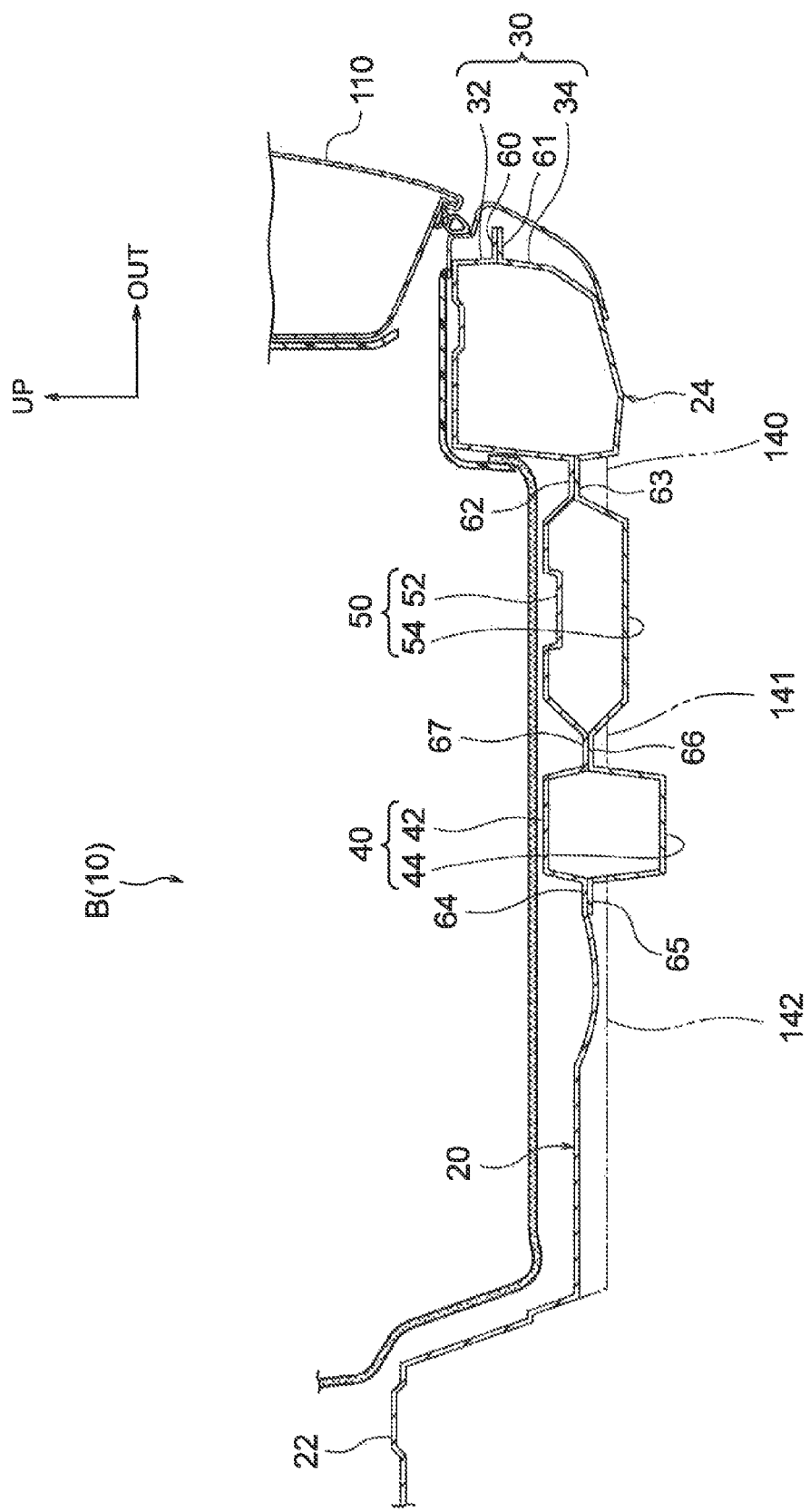

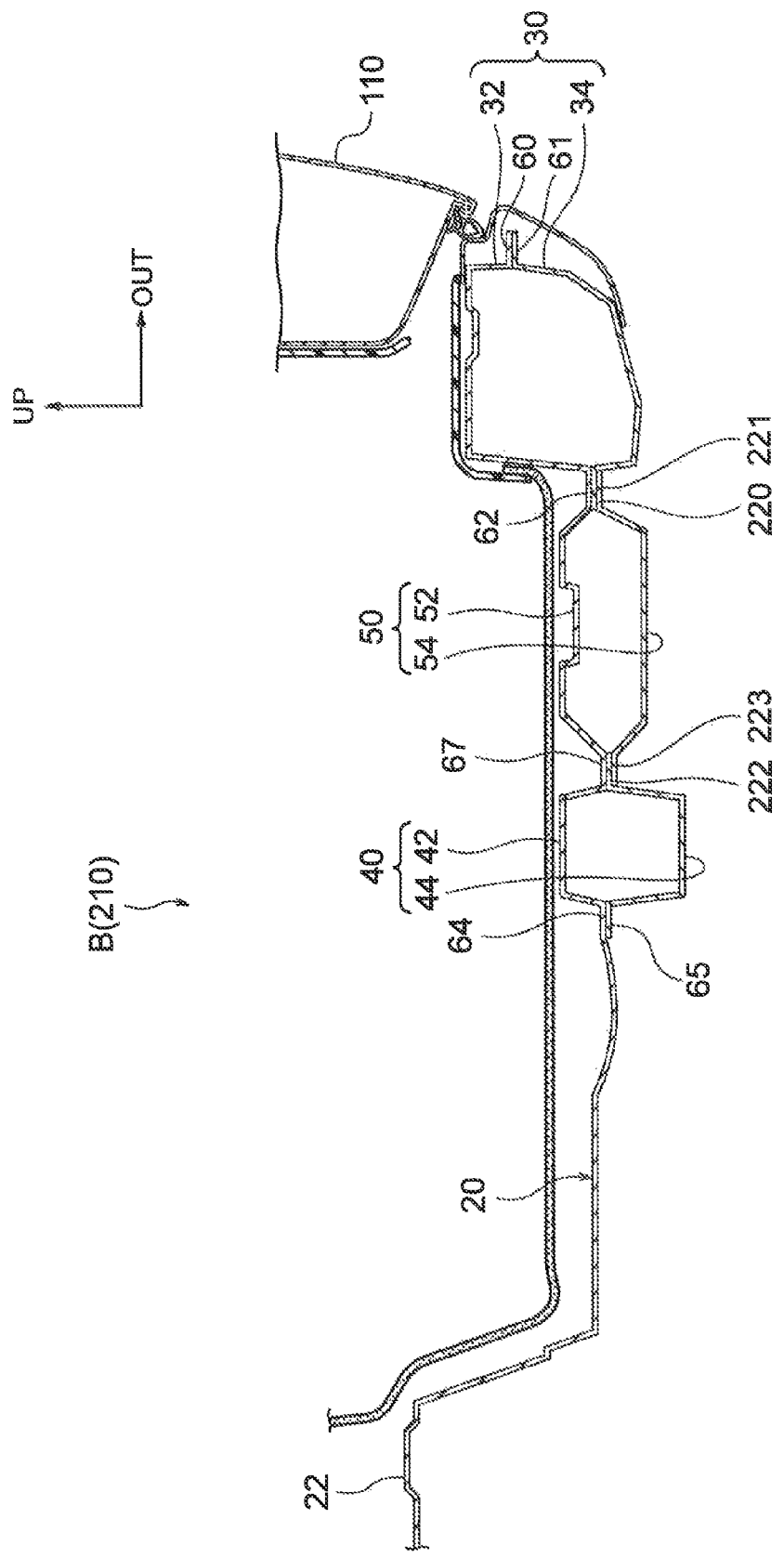

VEHICLE BODY STRUCTURE

CROSS-REFERENCE TO RELATED APPLICATIONS

This application is a national phase application of International Application No. PCT/JP2011/069951, filed Sep. 1, 2011, the content of which is incorporated herein by reference.

TECHNICAL FIELD

The present invention relates to a vehicle body structure.

BACKGROUND ART

There are conventionally known vehicle body structures having a rocker that is provided at the vehicle transverse direction outer side of the floor panel and that is divided in the vehicle transverse direction. Further, among such vehicle body structures, there are those having a reinforcing member that is provided at the vehicle transverse direction central side of the floor panel, and a floor under reinforcement and a floor upper reinforcement that are provided at the central portion between this reinforcing member and the rocker and that are disposed at the vehicle rear side of a front side member (refer to, for example, Patent Document 1).

PRIOR ART DOCUMENTS

Patent Documents

[Patent Document 1] Japanese Patent Application Laid-Open No. 2006-264541
[Patent Document 2] Japanese Patent Application Laid-Open No. 6-321137
[Patent Document 3] Japanese Utility Model Application Laid-Open No. 6-27452
[Patent Document 4] Japanese Patent Application Laid-Open No. 2008-68720
[Patent Document 5] Japanese Patent Application Laid-Open No. 2008-279889
[Patent Document 6] Japanese Patent Application Laid-Open No. 2010-155403
[Patent Document 7] Japanese Patent Application Laid-Open No. 6-99857
[Patent Document 8] Japanese Patent Application Laid-Open No. 7-61374
[Patent Document 9] Japanese Utility Model Application Laid-Open No. 4-35974
[Patent Document 10] Japanese Patent Application Laid-Open No. 2000-264256

SUMMARY OF INVENTION

Technical Problem

However, in the above-described vehicle body structure, when an offset collision, in which a collision body collides with a vehicle transverse direction one side of the vehicle front surface, arises, the collision load that is transmitted to the front side member is, in addition to being transmitted to the rocker and the floor under reinforcement and the floor upper reinforcement, transmitted to the reinforcing member that is provided at the vehicle transverse direction inner side of these.

Namely, due to a portion of the collision load that is transmitted to the front side member being transmitted to the reinforcing member, the portion of the collision load is transmitted to the vehicle rear side after detouring once toward the vehicle transverse direction inner side. Accordingly, there is room for improvement in order to efficiently transmit the collision load at the time of an offset collision and improve the collision performance at the time of an offset collision.

Further, also when improving the collision performance at the time of an offset collision, it is desirable to suppress an increase in the number of parts and to reduce costs.

The present invention was made in consideration of the above-described problems, and an object thereof is to provide a vehicle body structure that, while reducing costs, can improve the collision performance at the time of an offset collision.

Solution to Problem

In order to overcome the above-described problems, a vehicle body structure relating to a first aspect of the present invention comprises: a floor panel that structures a floor portion of a vehicle cabin; a rocker that is provided so as to extend in a vehicle longitudinal direction at a vehicle transverse direction outer side of the floor panel, whose cross-section cut along a vehicle transverse direction forms a closed cross-sectional shape, and that has a rocker upper and a rocker lower that are divided in a vehicle vertical direction; a floor reinforcement that is provided so as to extend in the vehicle longitudinal direction at a central portion between the rocker and a tunnel portion formed at a vehicle transverse direction central portion of the floor panel, and that is disposed at a vehicle rear side of a front side member provided at a vehicle body front portion; and an intermediate reinforcement lower that structures an intermediate reinforcement provided so as to extend in the vehicle longitudinal direction between the rocker and the floor reinforcement, and that is disposed at a vehicle lower side of the floor panel, and that is formed integrally with the rocker lower via a flange portion that is joined, from the vehicle lower side, to a vehicle transverse direction outer side end portion at the floor panel.

In accordance with this vehicle body structure, the floor reinforcement is provided at the vehicle rear side of the front side member, at the central portion between the rocker and the tunnel portion that is formed at the vehicle transverse direction central portion of the floor panel. Further, the intermediate reinforcement is provided between the rocker and the floor reinforcement.

Accordingly, when an offset collision, in which a collision body collides with one vehicle transverse direction side of the vehicle front surface, arises, the collision load transmitted through the front side member is transmitted to the vehicle rear side through three skeletons that are the rocker, the floor reinforcement and the intermediate reinforcement, without detouring once toward the vehicle transverse direction inner side. Due thereto, the collision load at the time of an offset collision can be efficiently transmitted, and therefore, the collision performance at the time of an offset collision can be improved.

Moreover, as described above, the collision load at the time of an offset collision can be efficiently transmitted to the vehicle rear side through three skeletons that are the rocker, the floor reinforcement and the intermediate reinforcement. Therefore, the reinforcing member, that was provided at the vehicle transverse direction central side of the floor panel, i.e., in a vicinity of the tunnel portion, can be done away with.

Further, the intermediate reinforcement lower, that structures the newly-added intermediate reinforcement, is formed integrally with the rocker lower via the flange portion that is joined, from the vehicle lower side, to the vehicle transverse direction outer side end portion at the floor panel. Due thereto, an increase in the number of parts can be suppressed, and therefore, costs can be reduced.

A vehicle body structure relating to a second aspect of the present invention is structured such that, in the vehicle body structure relating to the first aspect of the present invention, ridge lines that extend in the vehicle longitudinal direction are formed respectively at a connected portion of the flange portion and the rocker lower, and a connected portion of the flange portion and the intermediate reinforcement lower.

In accordance with this vehicle body structure, ridge lines, that extend in the vehicle longitudinal direction, are formed at the connected portion of the flange portion and the rocker lower, and the connected portion of the flange portion and the intermediate reinforcement lower, respectively. Due thereto, the rigidity of the intermediate reinforcement lower can be improved. Due thereto, the collision load at the time of an offset collision can be transmitted even more efficiently.

A vehicle body structure relating to a third aspect of the present invention is structured such that, in the vehicle body structure relating to the first aspect or the second aspect of the present invention, the rocker upper is formed integrally with the vehicle transverse direction outer side end portion at the floor panel.

In accordance with this vehicle body structure, the rocker upper is formed integrally with the floor panel. Accordingly, due thereto as well, an increase in the number of parts can be suppressed, and therefore, costs can be reduced.

A vehicle body structure relating to a fourth aspect of the present invention is structured such that, in the vehicle body structure relating to any one of the first aspect through the third aspect of the present invention, the floor reinforcement has a floor reinforcement upper that is formed integrally with the floor panel, and a floor reinforcement lower that is disposed at the vehicle lower side of the floor panel and whose cross-section cut along the vehicle transverse direction forms a closed cross-sectional shape together with the floor reinforcement upper, and the intermediate reinforcement lower is formed integrally with the floor reinforcement lower via a flange portion that is formed between the intermediate reinforcement lower and the floor reinforcement lower and that is joined to the floor panel from the vehicle lower side.

In accordance with this vehicle body structure, the cross-section, that is cut along the vehicle transverse direction, of the floor reinforcement forms a closed cross-sectional shape. Due thereto, the rigidity of the floor reinforcement is improved, and therefore, the collision load at the time of an offset collision can be transmitted even more efficiently.

Moreover, the floor reinforcement upper that structures this floor reinforcement is formed integrally with the floor panel, and the floor reinforcement lower is formed integrally with the intermediate reinforcement lower via the flange portion that is formed between the floor reinforcement lower and the intermediate reinforcement lower. Accordingly, due thereto as well, an increase in the number of parts can be suppressed, and therefore, costs can be reduced.

A vehicle body structure relating to a fifth aspect of the present invention further has, in the vehicle body structure relating to any one of the first aspect through the fourth aspect of the present invention, an intermediate reinforcement upper that is formed integrally with the floor panel, and that, together with the intermediate reinforcement lower, structures the intermediate reinforcement whose cross-section cut along the vehicle transverse direction forms a closed cross-sectional shape.

In accordance with this vehicle body structure, the cross-section, that is cut along the vehicle transverse direction, of the intermediate reinforcement forms a closed cross-sectional shape. Due thereto, the rigidity of the intermediate reinforcement is improved, and therefore, the collision load at the time of an offset collision can be transmitted even more efficiently.

Moreover, the intermediate reinforcement upper that structures this intermediate reinforcement is formed integrally with the floor panel. Accordingly, due thereto as well, an increase in the number of parts can be suppressed, and therefore, costs can be reduced.

A vehicle body structure relating to a sixth aspect of the present invention is structured such that, in the vehicle body structure relating to any one of the first aspect through the fifth aspect of the present invention, among the floor panel, the rocker, the floor reinforcement and the intermediate reinforcement, at least the rocker is formed from a high tensile strength steel plate.

In accordance with this vehicle body structure, among the floor panel, the rocker, the floor reinforcement and the intermediate reinforcement, at least the rocker is formed from a high tensile strength steel plate. Due thereto, the vehicle body can be made to be lighter-weight, and the strength of at least the rocker can be improved.

A vehicle body structure relating to a seventh aspect of the present invention further has, in the vehicle body structure relating to any one of the first aspect through the sixth aspect of the present invention, a plurality of connecting portions that extend in the vehicle transverse direction and that connect respective spaces between the rocker, the intermediate reinforcement, the floor reinforcement and the tunnel portion.

In accordance with this vehicle body structure, respective spaces between the rocker, the intermediate reinforcement, the floor reinforcement and the tunnel portion are connected by plural connecting portions that extend in the vehicle transverse direction. Due thereto, the respective connection rigidities of the rocker, the intermediate reinforcement, the floor reinforcement and the tunnel portion are improved, and therefore, the collision load at the time of an offset collision can be transmitted even more efficiently, and the collision load at the time of a side collision also can be transmitted even more efficiently.

A vehicle body structure relating to an eighth aspect of the present invention is structured such that, in the vehicle body structure relating to any one of the first aspect through the seventh aspect of the present invention, the rocker upper has a pair of side wall portions that face one another in the vehicle transverse direction, and an upper wall portion that connects vehicle upper side end portions at the pair of side wall portions, and ridge lines that extend in the vehicle longitudinal direction are respectively formed at connected portions of the pair of side wall portions and the upper wall portion, and a pillar that extends in the vehicle vertical direction, whose lower portion is joined to the pair of side wall portions respectively, and that has a pair of ridge lines whose positions in the vehicle transverse direction coincide with those of the respective pair of ridge lines formed at the rocker upper, is provided at a vehicle upper side of the rocker.

In accordance with this vehicle body structure, positions, in the vehicle transverse direction, of the respective pair of ridge lines formed at the rocker upper and the pair of ridge lines formed at the pillar coincide. Therefore, the joining rigidity of the pillar to the rocker can be improved.

A vehicle body structure relating to a ninth aspect of the present invention is structured such that, in the vehicle body structure relating to the eighth aspect of the present invention, the pillar has a pillar lower, and a pillar upper whose lower end portion is joined to an upper end portion of the pillar lower in a state of being overlapped in the vehicle vertical direction, and a door hinge, that openably and closably supports a door provided at a side portion of a vehicle, is fixed to an overlapped portion of the pillar lower and the pillar upper.

In accordance with this vehicle body structure, the door hinge is fixed to the overlapped portion of the pillar lower and the pillar upper. Therefore, the mounting strength of the door hinge can be improved.

Advantageous Effects of Invention

As described above in detail, in accordance with the present invention, the collision performance at the time of an offset collision can be improved while costs are reduced.

BRIEF DESCRIPTION OF THE DRAWINGS

FIG. 8 is a cross-sectional view that corresponds to FIG. 2 and shows a third modified example of the vehicle body structure relating to the embodiment of the present invention.

FIG. 9 is a cross-sectional view, corresponding to FIG. 2, of a vehicle body structure relating to a reference example.

DESCRIPTION OF EMBODIMENTS

An embodiment of the present invention is described hereinafter with reference to the drawings.

Note that arrow UP, arrow FR, and arrow OUT shown in the respective drawings denote the vehicle vertical direction upper side, the vehicle longitudinal direction front side, and the vehicle transverse direction outer side (right side), respectively.

Figure 1:
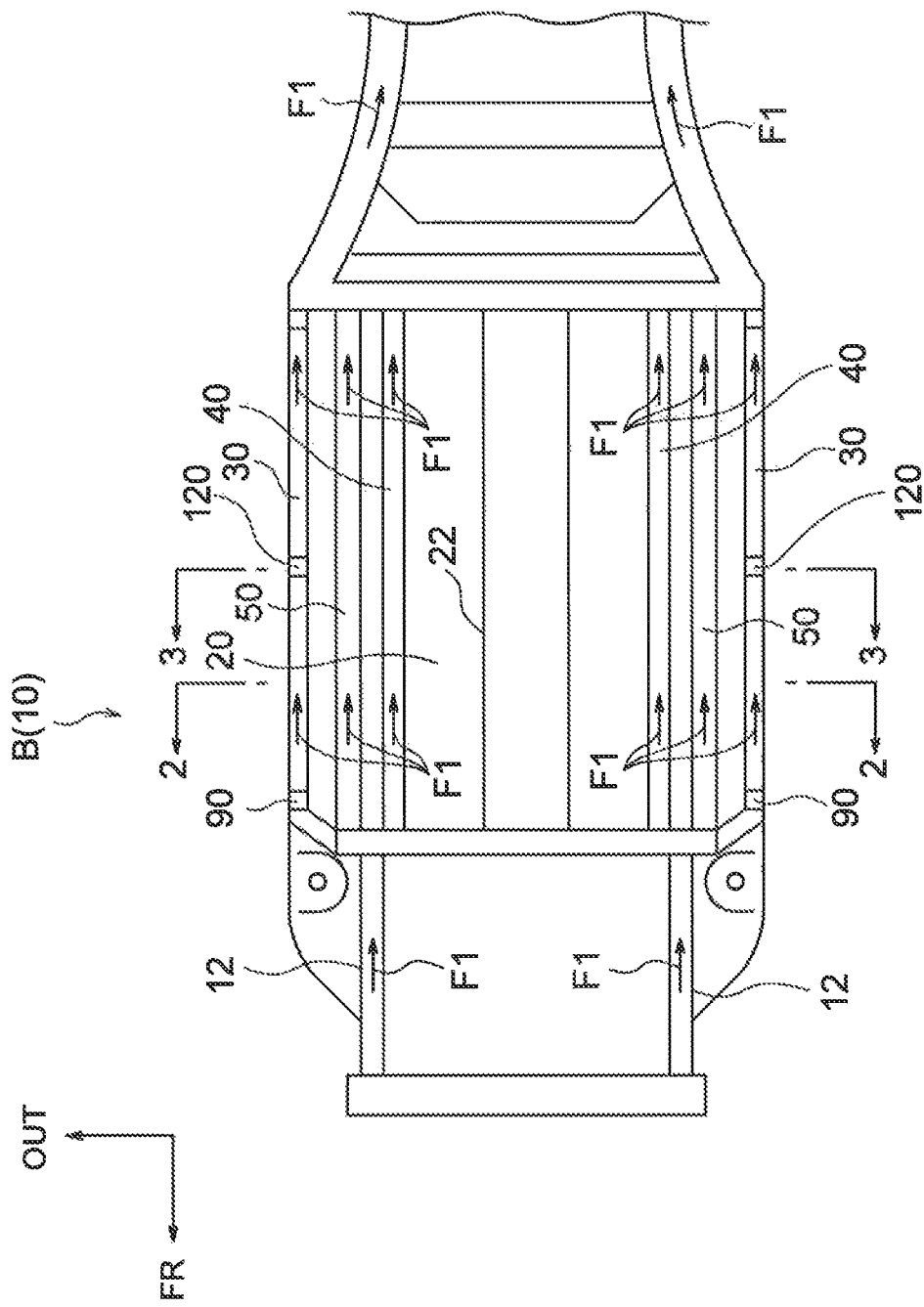
FIG. 1 is a plan view of a vehicle body to which a vehicle body structure relating to an embodiment of the present invention is applied.

A vehicle body structure 10 relating to an embodiment of the present invention is applied to vehicle body B shown in FIG. 1. This vehicle body B is used in a vehicle such as, for example, a passenger automobile or the like, and has a floor panel upper 20, rockers 30, floor reinforcements 40, and intermediate reinforcements 50.

Figure 2:
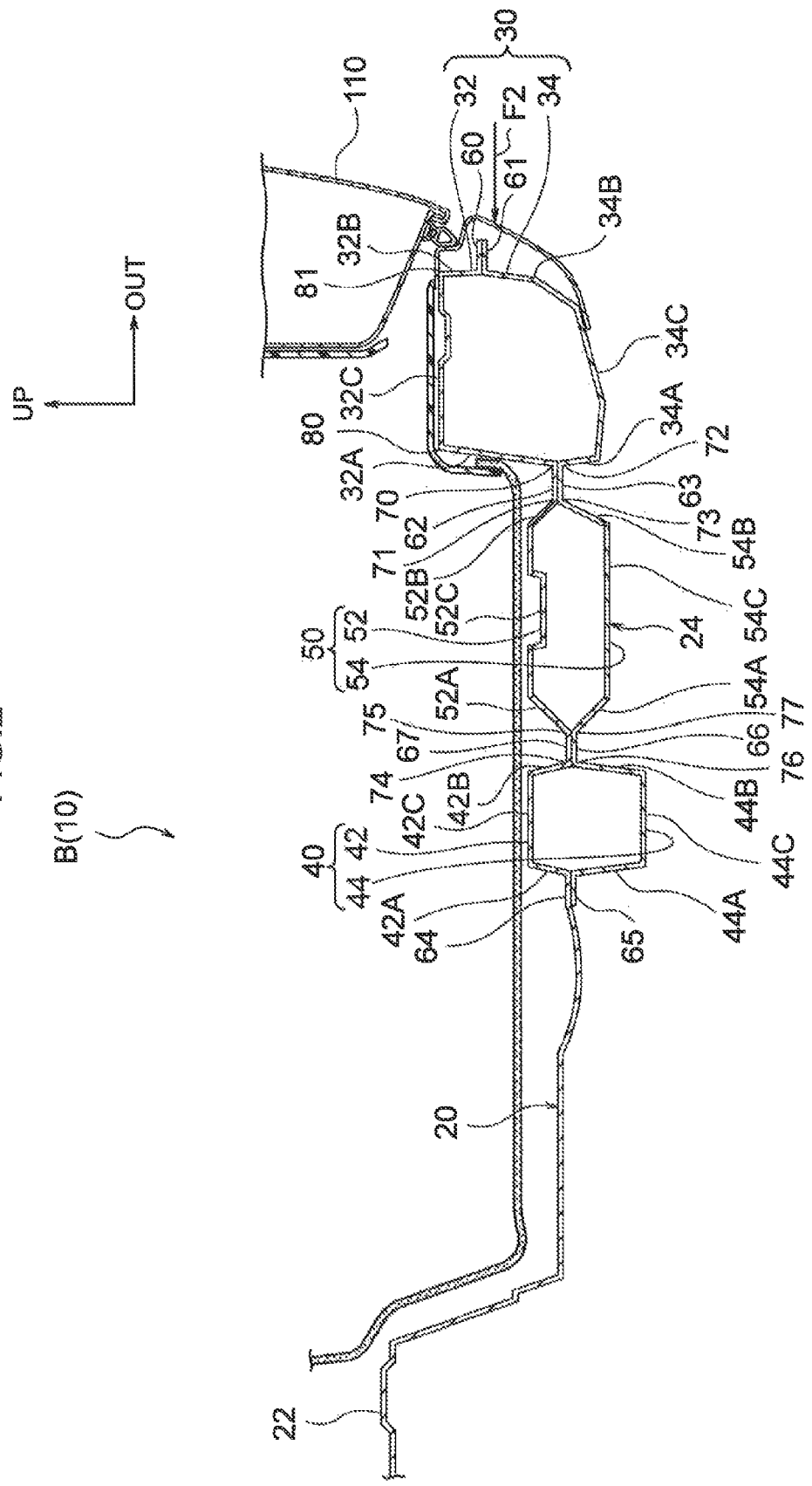
FIG. 2 is a cross-sectional view along line 2-2 of FIG. 1.

The floor panel upper 20 corresponds to the floor panel in the present invention. This floor panel upper 20 structures the floor portion of the vehicle cabin, and extends in the vehicle longitudinal direction and the vehicle transverse direction. A tunnel portion 22 that extends in the vehicle longitudinal direction is formed at the vehicle transverse direction central portion of this floor panel upper 20. As shown in FIG. 2, this tunnel portion 22 is convex toward the vehicle upper side. For example, an exhaust pipe that is connected to an unillustrated engine, and the like are disposed at the inner side of this tunnel portion 22.

The rockers 30 are provided so as to extend in the vehicle longitudinal direction, at the vehicle transverse direction outer sides of the floor panel upper 20. The cross-section, that is cut along the vehicle transverse direction, of this rocker 30 forms a closed cross-sectional shape, and the rocker 30 is structured to have a rocker upper 32 and a rocker lower 34 that are divided in the vehicle vertical direction.

The rocker upper 32 has a pair of side wall portions 32A, 32B that face one another in the vehicle transverse direction, and an upper wall portion 32C that connects the vehicle upper side end portions at this pair of side wall portions 32A, 32B, and the rocker upper 32 is convex toward the vehicle upper side. On the other hand, the rocker lower 34 has a pair of side wall portions 34A, 34B that face one another in the vehicle transverse direction, and a lower wall portion 34C that connects the vehicle lower side end portions at this pair of side wall portions 34A, 34B, and the rocker lower 34 is convex toward the vehicle lower side.

A flange portion 60, that extends toward the vehicle transverse direction outer side, is formed at the vehicle transverse direction outer side end portion of the rocker upper 32. A flange portion 61, that similarly extends toward the vehicle transverse direction outer side, is formed at the vehicle transverse direction outer side end portion of the rocker lower 34. This flange portion 60 and flange portion 61 are joined together by, for example, spot welding or the like, in a state of being superposed together in the vehicle vertical direction.

On the other hand, a flange portion 62, that extends toward the rocker upper 32 side, is formed at the vehicle transverse direction outer side end portion of the floor panel upper 20, and the rocker upper 32 is formed integrally with this flange portion 62. Further, a flange portion 63, that extends in the vehicle transverse direction, is formed between the rocker lower 34 and an intermediate reinforcement lower 54 that is described later. Moreover, this flange portion 63 is joined with this flange portion 62, by, for example, spot welding or the like, in a state in which the flange portion 63 is superposed with the flange portion 62 from the vehicle lower side.

Note that the flange portion 62 corresponds to the "vehicle transverse direction outer side end portion of the floor panel" in the present invention. Further, the flange portion 63 corresponds to the "flange portion that is joined, from the vehicle lower side, to the vehicle transverse direction outer side end portion of the floor panel" in the present invention.

The floor reinforcement 40 is provided so as to extend in the vehicle longitudinal direction, at the central portion between the tunnel portion 22 and the rocker 30. Further, as shown in FIG. 1, this floor reinforcement 40 is disposed at the vehicle rear side of a front side member 12 that is provided at the vehicle body front portion.

As shown in FIG. 2, the cross-section, that is cut along the vehicle transverse direction, of this floor reinforcement 40 forms a closed cross-sectional shape, and the floor reinforcement 40 is structured to have a floor reinforcement upper 42 and a floor reinforcement lower 44.

The floor reinforcement upper 42 is formed integrally with the floor panel upper 20. This floor reinforcement upper 42 has a pair of side wall portions 42A, 42B that face one another in the vehicle transverse direction, and an upper wall portion 42C that connects the vehicle upper side end portions of this pair of side wall portions 42A, 42B, and the floor reinforcement upper 42 is convex toward the vehicle upper side.

On the other hand, the floor reinforcement lower 44 is disposed at the vehicle lower side of the floor panel upper 20. This floor reinforcement lower 44 has a pair of side wall portions 44A, 44B that face one another in the vehicle transverse direction, and a lower wall portion 44C that connects the vehicle lower side end portions of this pair of side wall portions 44A, 44B, and the floor reinforcement lower 44 is convex toward the vehicle lower side.

Further, a flange portion 64, that extends toward the vehicle transverse direction inner side, is formed at the vehicle lower side end portion at the side wall portion 42A that is at the vehicle transverse direction inner side among the above-described pair of side wall portions 42A, 42B. On the other hand, a flange portion 65, that similarly extends toward the vehicle transverse direction inner side, is formed at the vehicle upper side end portion of the side wall portion 44A that is at the vehicle transverse direction inner side among the pair of side wall portions 44A, 44B. This flange portion 64 and flange portion 65 are joined together by, for example, spot welding or the like, in a state of being superposed together in the vehicle vertical direction.

The intermediate reinforcement 50 is provided so as to extend in the vehicle longitudinal direction, between the rocker 30 and the floor reinforcement 40. The cross-section, that is cut along the vehicle transverse direction, of this intermediate reinforcement 50 forms a closed cross-sectional shape, and the intermediate reinforcement 50 is structured to have an intermediate reinforcement upper 52 and the intermediate reinforcement lower 54.

The intermediate reinforcement upper 52 is formed integrally with the floor panel upper 20. This intermediate reinforcement upper 52 has a pair of side wall portions 52A, 52B that face one another in the vehicle transverse direction, and an upper wall portion 52C that connects the vehicle upper side end portions of this pair of side wall portions 52A, 52B, and the intermediate reinforcement upper 52 is convex toward the vehicle upper side.

On the other hand, the intermediate reinforcement lower 54 is disposed at the vehicle lower side of the floor panel upper 20. This intermediate reinforcement lower 54 has a pair of side wall portions 54A, 54B that face one another in the vehicle transverse direction, and a lower wall portion 54C that connects the vehicle lower side end portions of this pair of side wall portions 54A, 54B, and the intermediate reinforcement lower 54 is convex toward the vehicle lower side.

This intermediate reinforcement lower 54 is formed integrally with the rocker lower 34 via the above-described flange portion 63. Further, this intermediate reinforcement lower 54 is formed integrally with the floor reinforcement lower 44 via a flange portion 66 that is formed between the intermediate reinforcement lower 54 and the floor reinforcement lower 44.

Namely, the above-described rocker lower 34, floor reinforcement lower 44 and intermediate reinforcement lower 54 are formed integrally with a floor panel lower 24 that is provided at the vehicle lower side of the floor panel upper 20.

Further, the above-described flange portion 66 is joined, by, for example, spot welding or the like, to a flange portion 67 in a state of being superposed, from the vehicle lower side, with the flange portion 67 that is formed between the floor reinforcement upper 42 and the intermediate reinforcement upper 52 at the floor panel upper 20.

Note that the flange portion 66 corresponds to the "flange portion that is formed between the intermediate reinforcement lower and the floor reinforcement lower and that is joined to the floor panel from the vehicle lower side".

Further, ridge lines 70, 71, that extend in the vehicle longitudinal direction, are formed at the connected portion of the flange portion 62 and the rocker upper 32, and the connected portion of the flange portion 62 and the intermediate reinforcement upper 52, respectively. Similarly, ridge lines 72, 73, that extend in the vehicle longitudinal direction, are formed at the connected portion of the flange portion 63 and the rocker lower 34, and the connected portion of the flange portion 63 and the intermediate reinforcement lower 54, respectively.

Further, ridge lines 74, 75, that extend in the vehicle longitudinal direction, are formed at the connected portion of the flange portion 67 and the floor reinforcement upper 42, and the connected portion of the flange portion 67 and the intermediate reinforcement upper 52, respectively. Similarly, ridge lines 76, 77, that extend in the vehicle longitudinal direction, are formed at the connected portion of the flange portion 66 and the floor reinforcement lower 44, and the connected portion of the flange portion 66 and the intermediate reinforcement lower 54, respectively.

Note that it is suitable for all of the above-described floor panel upper 20, rockers 30, floor reinforcements 40 and intermediate reinforcements 50 to be formed of high tensile strength steel plates. Further, in this case, it is suitable that, among the floor panel upper 20, the rockers 30, the floor reinforcements 40 and the intermediate reinforcements 50, at least the rockers 30 be formed of high tensile strength steel plates.

Further, the thicknesses and the materials of the floor panel upper 20, the rockers 30, the floor reinforcements 40 and the intermediate reinforcements 50 may be different from one another. In this case, at the time of forming the floor panel upper 20 and the floor panel lower 24, it is suitable to use tailored blanking for example.

Figure 3:
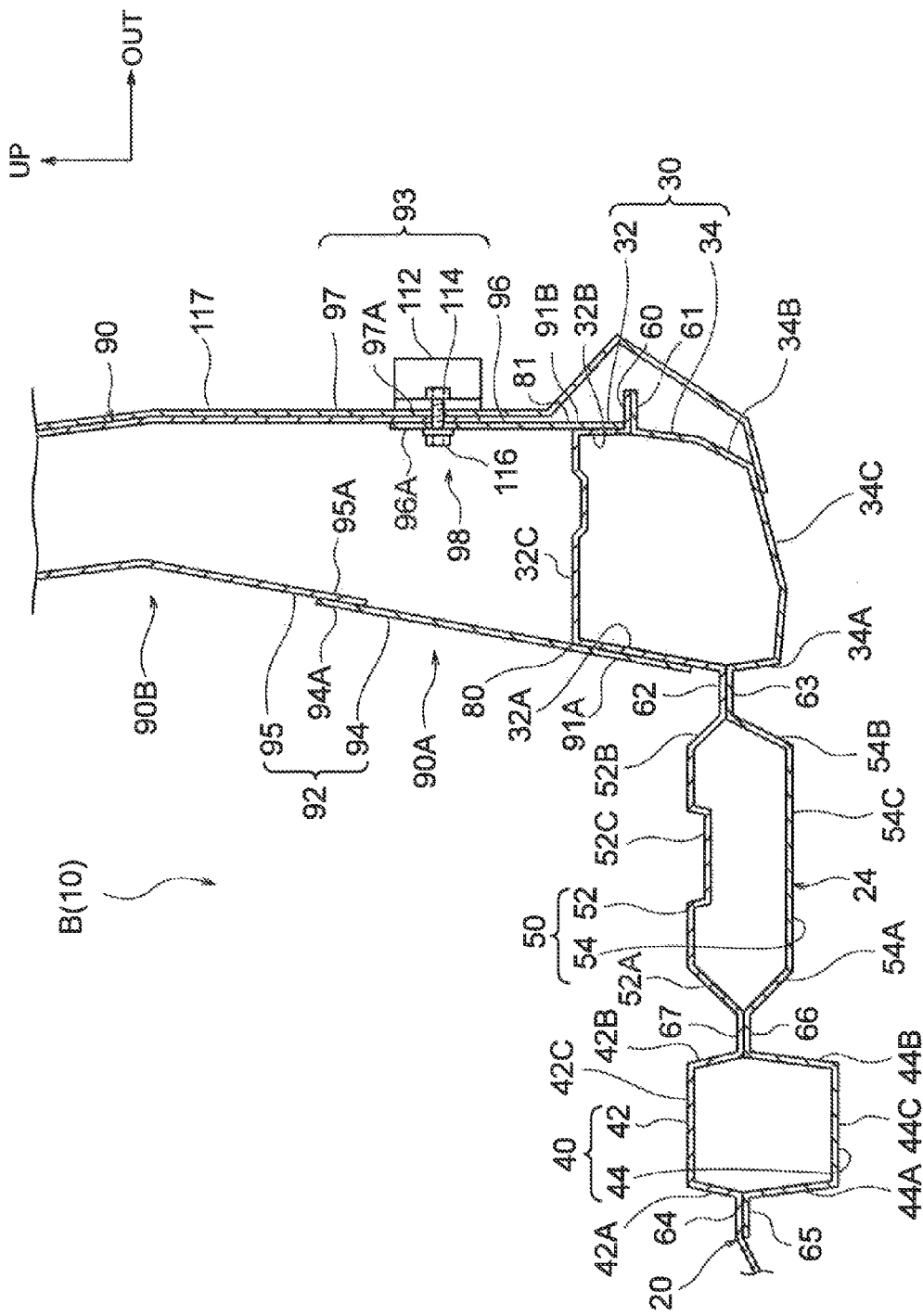
FIG. 3 is a cross-sectional view along line 3-3 of FIG. 1.
Figure 4:
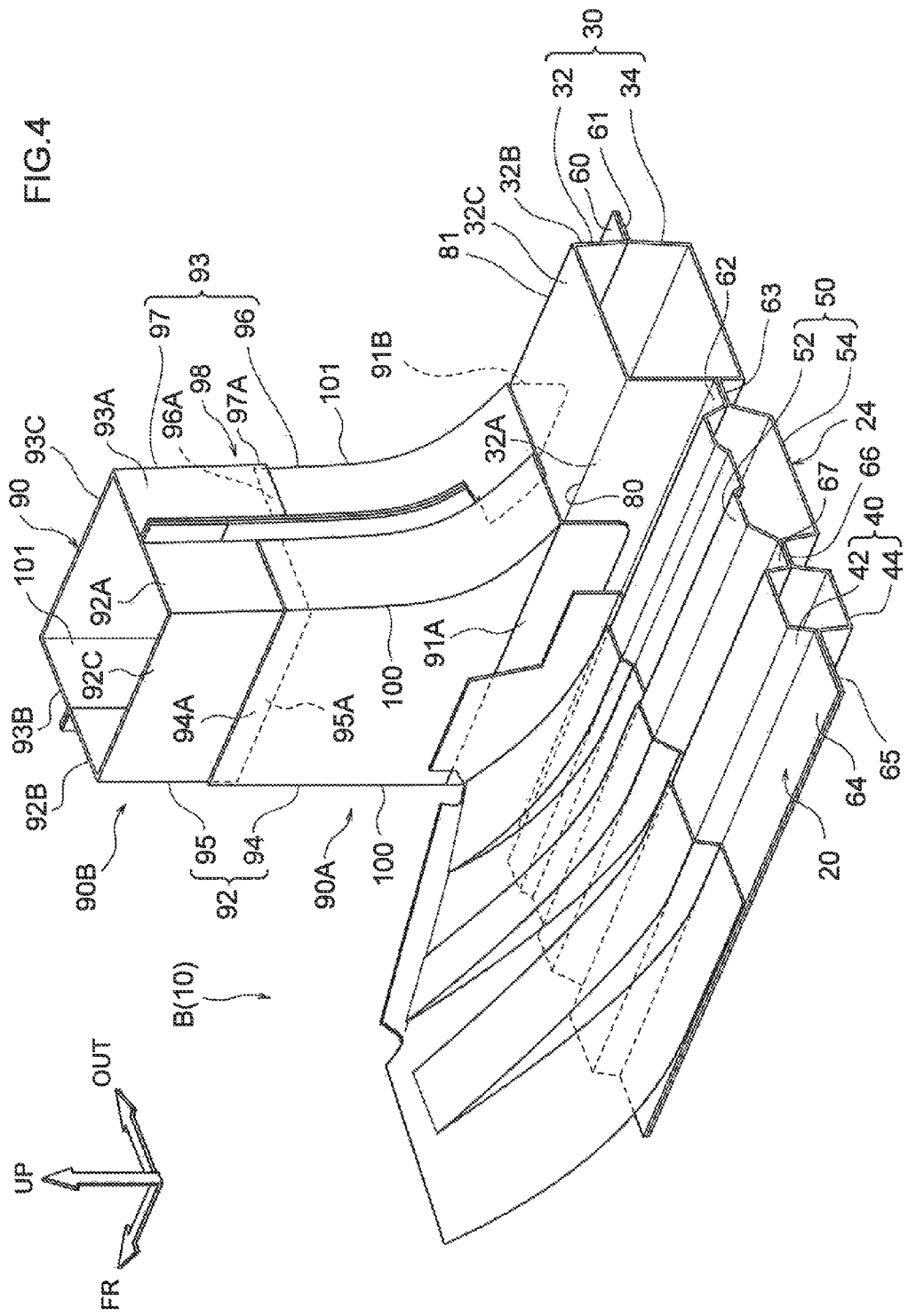
FIG. 4 is an enlarged perspective view of main portions of a peripheral portion of a front pillar of the vehicle body shown in FIG. 1.

Further, as shown in FIG. 3 and FIG. 4, ridge lines 80, 81 are formed at the connected portions of the pair of side wall portions 32A, 32B and the upper wall portion 32C at the above-described rocker upper 32, respectively. This pair of ridge lines 80, 81 respectively extend in the vehicle longitudinal direction.

Further, a front pillar 90 that extends in the vehicle vertical direction is provided at the vehicle upper side of the rocker 30. A pair of joining pieces 91A, 91B, that face one another in the vehicle transverse direction, are formed at the lower portion of this front pillar 90. This pair of joining pieces 91A, 91B are respectively joined by, for example, spot welding or the like, to the pair of side wall portions 32A, 32B respectively, in states of being superposed in the vehicle transverse direction with the pair of side wall portions 32A, 32B respectively.

Further, the cross-section, that is cut along the vehicle horizontal direction, of this front pillar 90 forms a closed cross-sectional shape, and the front pillar 90 is structured to have a front pillar inner 92 and a front pillar outer 93 that are divided in the vehicle transverse direction.

As shown in FIG. 4, the front pillar inner 92 has a pair of side wall portions 92A, 92B that face one another in the vehicle longitudinal direction, and an inner wall portion 92C that connects the vehicle transverse direction inner side end portions of this pair of side wall portions 92A, 92B, and the front pillar inner 92 is convex toward the vehicle transverse direction inner side. On the other hand, the front pillar outer 93 has a pair of side wall portions 93A, 93B that face one another in the vehicle longitudinal direction, and an outer wall portion 93C that connects the vehicle transverse direction outer side end portions of this pair of side wall portions 93A, 93B, and the front pillar outer 93 is convex toward the vehicle transverse direction outer side.

The lower portion of the side wall portion 92A that is at the vehicle rear side among the pair of side wall portions 92A, 92B is curved so as to head toward the vehicle rear side while heading toward the vehicle lower side. Similarly, the lower portion of the side wall portion 93A that is at the vehicle rear side among the pair of side wall portions 93A, 93B is curved so as to head toward the vehicle rear side while heading toward the vehicle lower side.

Further, ridge lines 100 are formed at the connected portions of the above-described pair of side wall portions 92A, 92B and the inner wall portion 92C, respectively. This pair of ridge lines 100 respectively extend in the vehicle vertical direction. Similarly, ridge lines 101 are formed at the connected portions of the pair of side wall portions 93A, 93B and the outer wall portion 93C, respectively. This pair of ridge lines 101 respectively extend in the vehicle vertical direction.

The vehicle transverse direction positions of the pair of ridge lines 100 respectively coincide with that of the above-described ridge line 80, and the vehicle transverse direction positions of the pair of ridge lines 101 respectively coincide with that of the above-described ridge line 81. Namely, the ridge line 100 at the vehicle rear side among the pair of ridge lines 100 is curved so as to head toward the vehicle rear side while heading toward the vehicle lower side, and is continuous with the ridge line 80. Further, the ridge line 100 at the vehicle front side among the pair of ridge lines 100 extends in the vehicle vertical direction and is continuous with the ridge line 80 (intersects the ridge line 80). Similarly, the ridge line 101 at the vehicle rear side among the pair of ridge lines 101 is curved so as to head toward the vehicle rear side while heading toward the vehicle lower side, and is continuous with the ridge line 81. Further, the ridge line 101 at the vehicle front side among the pair of ridge lines 101 extends in the vehicle vertical direction and is continuous with the ridge line 81 (intersects the ridge line 81).

Further, the above-described front pillar inner 92 is structured to have a front pillar inner lower 94 and a front pillar inner upper 95. A lower end portion 95A of the front pillar inner upper 95 is joined by, for example, spot welding or the like, in a state of being overlapped, in the vehicle vertical direction, with an upper end portion 94A of the front pillar inner lower 94.

Similarly, the above-described front pillar outer 93 is structured to have a front pillar outer lower 96 and a front pillar outer upper 97. A lower end portion 97A of the front pillar outer upper 97 is joined by, for example, spot welding or the like, in a state of being overlapped, in the vehicle vertical direction, with an upper end portion 96A of the front pillar outer lower 96.

Further, as shown in FIG. 3, a door hinge 112, that openably and closably supports a front door 110 (see FIG. 2) that is provided at a side portion of the vehicle, is fixed by a bolt 114 and a nut 116 to an overlapped portion 98 of the front pillar outer lower 96 and the front pillar outer upper 97.

Further, the front pillar inner lower 94 and the front pillar outer lower 96 structure a front pillar lower 90A, and the front pillar inner upper 95 and the front pillar outer upper 97 structure a front pillar upper 90B. A side outer panel 117 is provided at the vehicle transverse direction outer side of this front pillar 90.

Note that the above-described front pillar 90 corresponds to the "pillar" in the present invention. Further, the front pillar lower 90A corresponds to the "pillar lower" in the present invention, and the front pillar upper 90B corresponds to the "pillar upper" in the present invention. Moreover, the front door 110 corresponds to the "door" in the present invention, and the joining pieces 91A, 91B correspond to the "lower portion of the pillar" in the present invention.

Figure 5:
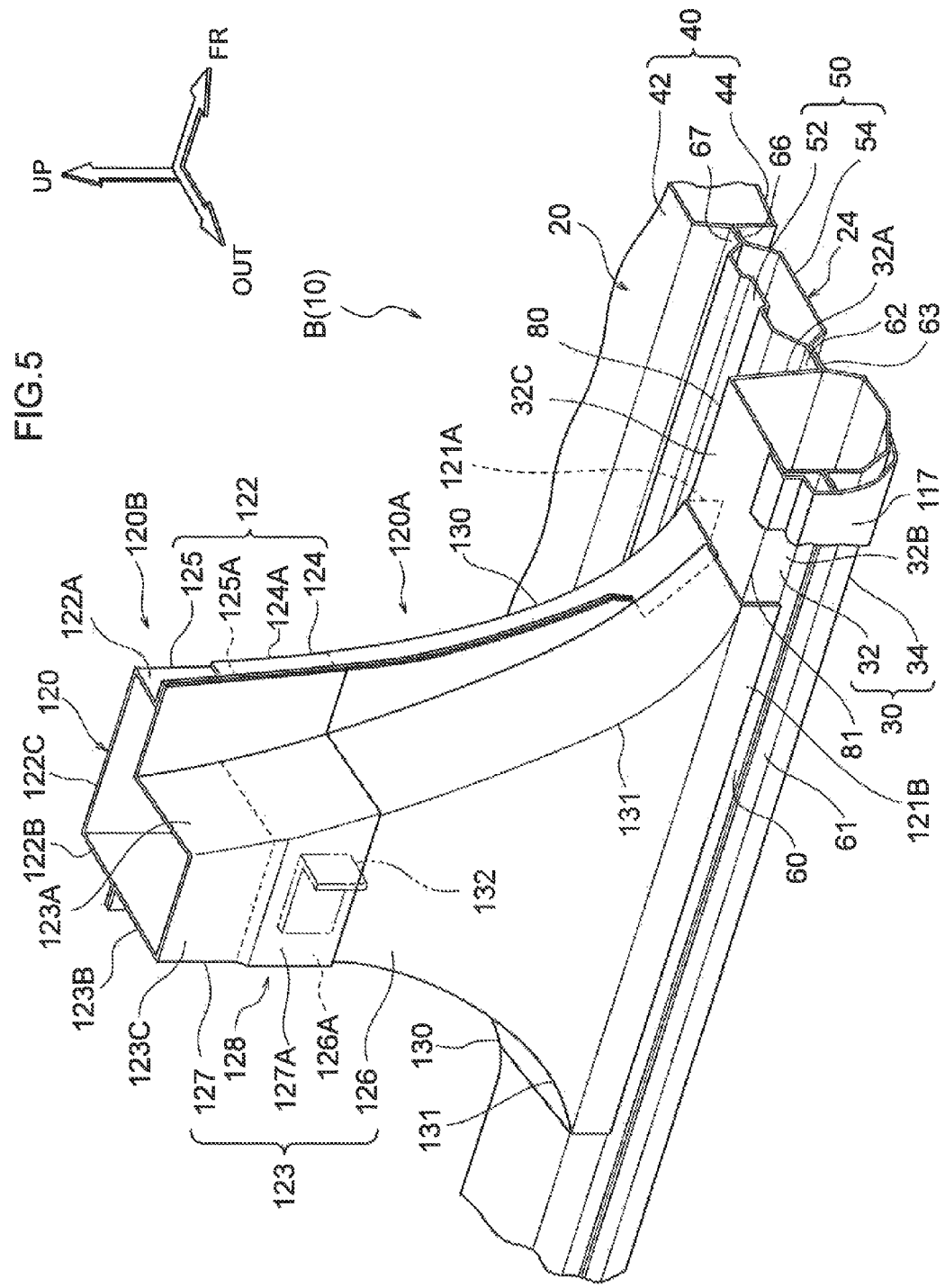
FIG. 5 is an enlarged perspective view of main portions of a peripheral portion of a center pillar of the vehicle body shown in FIG. 1.

Further, as shown in FIG. 5, a center pillar 120 is provided at the vehicle rear side of this front pillar 90. This center pillar 120 is provided so as to extend in the vehicle vertical direction, at the vehicle upper side of the rocker 30. A pair of joining pieces 121A, 121B, that face one another in the vehicle transverse direction, are formed at the lower portion of this center pillar 120. This pair of joining pieces 121A, 1211B are respectively joined by, for example, spot welding or the like, to the pair of side wall portions 32A, 32B respectively, in states of being superposed in the vehicle transverse direction with the pair of side wall portions 32A, 32B respectively.

Further, the cross-section, that is cut along the vehicle horizontal direction, of this center pillar 120 forms a closed cross-sectional shape, and the center pillar 120 is structured to have a center pillar inner 122 and a center pillar outer 123 that are divided in the vehicle transverse direction.

The center pillar inner 122 has a pair of side wall portions 122A, 122B that face one another in the vehicle longitudinal direction, and an inner wall portion 122C that connects the vehicle transverse direction inner side end portions of this pair of side wall portions 122A, 122B, and the center pillar inner 122 is convex toward the vehicle transverse direction inner side. On the other hand, the center pillar outer 123 has a pair of side wall portions 123A, 123B that face one another in the vehicle longitudinal direction, and an outer wall portion 123C that connects the vehicle transverse direction outer side end portions of this pair of side wall portions 123A, 123B, and the center pillar outer 123 is convex toward the vehicle transverse direction outer side.

The lower portions of the side wall portions 122A, 123A are curved so as to head toward the vehicle front side while heading toward the vehicle lower side. Similarly, the lower portions of the side wall portions 122B, 123B are curved so as to head toward the vehicle rear side while heading toward the vehicle lower side.

Further, ridge lines 130 are formed at the connected portions of the above-described pair of side wall portions 122A, 122B and the inner wall portion 122C, respectively. This pair of ridge lines 130 respectively extend in the vehicle vertical direction. Similarly, ridge lines 131 are formed at the connected portions of the pair of side wall portions 123A, 123B and the outer wall portion 123C, respectively. This pair of ridge lines 131 respectively extend in the vehicle vertical direction.

The vehicle transverse direction positions of the pair of ridge lines 130 respectively coincide with that of the above-described ridge line 80, and the vehicle transverse direction positions of the pair of ridge lines 131 respectively coincide with that of the above-described ridge line 81. The ridge line 130 at the vehicle rear side among the pair of ridge lines 130 is curved so as to head toward the vehicle rear side while heading toward the vehicle lower side, and is continuous with the ridge line 80. Further, the ridge line 130 at the vehicle front side among this pair of ridge lines 130 is curved so as to head toward the vehicle front side while heading toward the vehicle lower side, and is continuous with the ridge line 80. Similarly, the ridge line 131 at the vehicle rear side among the pair of ridge lines 131 is curved so as to head toward the vehicle rear side while heading toward the vehicle lower side, and is continuous with the ridge line 81. Further, the ridge line 131 at the vehicle front side among this pair of ridge lines 131 is curved so as to head toward the vehicle front side while heading toward the vehicle lower side, and is continuous with the ridge line 81.

Further, the above-described center pillar inner 122 is structured to have a center pillar inner lower 124 and a center pillar inner upper 125. A lower end portion 125A of the center pillar inner upper 125 is joined by, for example, spot welding or the like, in a state of being overlapped, in the vehicle vertical direction, with an upper end portion 124A of the center pillar inner lower 124.

Similarly, the above-described center pillar outer 123 is structured to have a center pillar outer lower 126 and a center pillar outer upper 127. A lower end portion 127A of the center pillar outer upper 127 is joined by, for example, spot welding or the like, in a state of being overlapped, in the vehicle vertical direction, with an upper end portion 126A of the center pillar outer lower 126.

Further, a door hinge 132, that openably and closably supports an unillustrated rear door that is provided at a side portion of the vehicle, is fixed to an overlapped portion 128 of the center pillar outer lower 126 and the center pillar outer upper 127.

Further, the center pillar inner lower 124 and the center pillar outer lower 126 structure a center pillar lower 120A, and the center pillar inner upper 125 and the center pillar outer upper 127 structure a center pillar upper 120B.

Note that the above-described center pillar 120 corresponds to the "pillar" in the present invention. Further, the center pillar lower 120A corresponds to the "pillar lower" in the present invention, and the center pillar upper 120B corresponds to the "pillar upper" in the present invention. Moreover, the above-described, unillustrated rear door corresponds to the "door" in the present invention, and the joining pieces 121A, 121B correspond to the "lower portion of the pillar" in the present invention.

Operation and effects of the embodiment of the present invention are described next.

As shown in FIG. 1, in accordance with this vehicle body structure 10, the floor reinforcements 40 are provided at the vehicle rear sides of the front side members, at central portions between the rockers 30 and the tunnel portion 22 that is formed at the vehicle transverse direction central portion of the floor panel upper 20. Further, the intermediate reinforcements 50 are provided between the rockers 30 and the floor reinforcements 40.

Accordingly, when an offset collision, in which a collision body collides with a vehicle transverse direction one side of the vehicle front surface, arises, collision load F1 that is transmitted to the front side member 12 is transmitted to the vehicle rear side through three skeletons that are the rocker 30, the floor reinforcement 40 and the intermediate reinforcement 50, without detouring once toward the vehicle transverse direction inner side. Due thereto, the collision load at the time of an offset collision can be efficiently transmitted, and therefore, the collision performance at the time of an offset collision can be improved.

Moreover, as described above, the collision load F1 at the time of an offset collision can be efficiently transmitted to the vehicle rear side through the rocker 30, the floor reinforcement 40 and the intermediate reinforcement 50. Therefore, the reinforcing member, that was provided at the vehicle transverse direction central side of the floor panel upper 20, i.e., in a vicinity of the tunnel portion 22, can be done away with.

Further, as shown in FIG. 2, the intermediate reinforcement lower 54, that structures the intermediate reinforcement 50 that is newly added, is formed integrally with the rocker lower 34 via the flange portion 63, and is formed integrally with the floor reinforcement lower 44 via the flange portion 66. Moreover, the intermediate reinforcement upper 52 and the floor reinforcement upper 42 are formed integrally with the floor panel upper 20, and the rocker upper 32 is formed integrally with the floor panel upper 20. Due thereto, an increase in the number of parts can be suppressed, and therefore, costs can be reduced.

Further, the cross-sections, that are cut along the vehicle transverse direction, of the floor reinforcement 40 and the intermediate reinforcement 50 respectively form closed cross-sectional shapes. Due thereto, the rigidities of the floor reinforcement 40 and the intermediate reinforcement 50 are improved, and therefore, the collision load at the time of an offset collision can be transmitted even more efficiently.

Further, the ridge lines 70, 71 that extend in the vehicle longitudinal direction are formed at the connected portion of the flange portion 62 and the rocker upper 32, and the connected portion of the flange portion 62 and the intermediate reinforcement upper 52, respectively. The ridge lines 74, 75 that extend in the vehicle longitudinal direction are formed at the connected portion of the flange portion 67 and the floor reinforcement upper 42, and the connected portion of the flange portion 67 and the intermediate reinforcement upper 52, respectively.

Similarly, the ridge lines 72, 73 that extend in the vehicle longitudinal direction are formed at the connected portion of the flange portion 63 and the rocker lower 34, and the connected portion of the flange portion 63 and the intermediate reinforcement lower 54, respectively. The ridge lines 76, 77 that extend in the vehicle longitudinal direction are formed at the connected portion of the flange portion 66 and the floor reinforcement lower 44, and the connected portion of the flange portion 66 and the intermediate reinforcement lower 54, respectively.

Due thereto, the rigidities of the floor reinforcement 40 and the intermediate reinforcement 50 can be improved. Accordingly, due thereto as well, the collision load at the time of an offset collision can be transmitted even more efficiently.

Further, as described above, the intermediate reinforcement 50 is provided between the rocker 30 and the floor reinforcement 40. Therefore, even when collision load F2 is inputted to the rocker 30 at the time of a side collision as shown in FIG. 2, the collision load F2 can be transmitted to the vehicle transverse direction inner side in the order of the rocker 30, the intermediate reinforcement 50, and the floor reinforcement 40. Accordingly, the collision load F2 at the time of a side collision also can be transmitted efficiently, and therefore, the collision performance at the time of a side collision also can be improved.

Moreover, also at the time of a slightly overlapped collision in which a collision body collides with the vehicle front surface further toward the vehicle transverse direction outer side than in the case of an offset collision, the collision load can be transmitted to the vehicle rear side through the rocker 30 and the intermediate reinforcement 50. Due thereto, the collision load at the time of a slightly overlapped collision also can be efficiently transmitted, and therefore, the collision performance at the time of a slightly overlapped collision also can be improved.

Further, it is suitable that, among the floor panel upper 20, the rockers 30, the floor reinforcements 40 and the intermediate reinforcements 50, at least the rockers 30 are formed of high tensile strength steel plates. By structuring in this way, the weight of the vehicle body can be reduced, and the strength of at least the rockers 30 can be improved.

Further, as shown in FIG. 4, the positions in the vehicle transverse direction of the respective pair of ridge lines 80, 81 that are formed at the rocker upper 32, and the pair of ridge lines 100, 101 that are formed at the front pillar 90, coincide, and therefore, the joining rigidity of the front pillar 90 to the rocker 30 can be improved. Similarly, as shown in FIG. 5, the positions in the vehicle transverse direction of the respective pair of ridge lines 80, 81 that are formed at the rocker upper 32, and the pair of ridge lines 130, 131 that are formed at the center pillar 120, coincide, and therefore, the joining rigidity of the center pillar 120 to the rocker 30 can be improved.

Due thereto, reinforcing members for reinforcing the front pillar 90 and the center pillar 120 can be reduced or made compact, and therefore, costs can be reduced and the weight can be lightened.

Further, as described above, because the joining rigidities of the front pillar 90 and the center pillar 120 to the rocker 30 are improved, the cabin space can be ensured even when a side collision, an offset collision, a slightly overlapped collision or the like arises.

Further, because the door hinge 112 is fixed to the overlapped portion 98 of the front pillar lower 90A and the front pillar upper 90B as shown in FIG. 3, the mounting strength of the door hinge 112 can be improved. Similarly, because the door hinge 132 is fixed to the overlapped portion 128 of the center pillar lower 120A and the center pillar upper 120B as shown in FIG. 5, the mounting strength of the door hinge 132 can be improved.

Further, as shown in FIG. 2, the rocker 30 is structured to have the rocker upper 32 and the rocker lower 34 that are divided in the vehicle vertical direction. Accordingly, because the flange portions 60, 61 or the flange portions 62, 63 that join this rocker upper 32 and rocker lower 34 do not project toward the vehicle upper side, the amount of projection of the rocker 30 toward the vehicle upper side can be suppressed. Due thereto, the height of the rocker 30 can be made to be low, and therefore, the ease of ingress/egress into and out of the vehicle can be improved.

A modified example of the embodiment of the present invention is described next.

Figure 6:
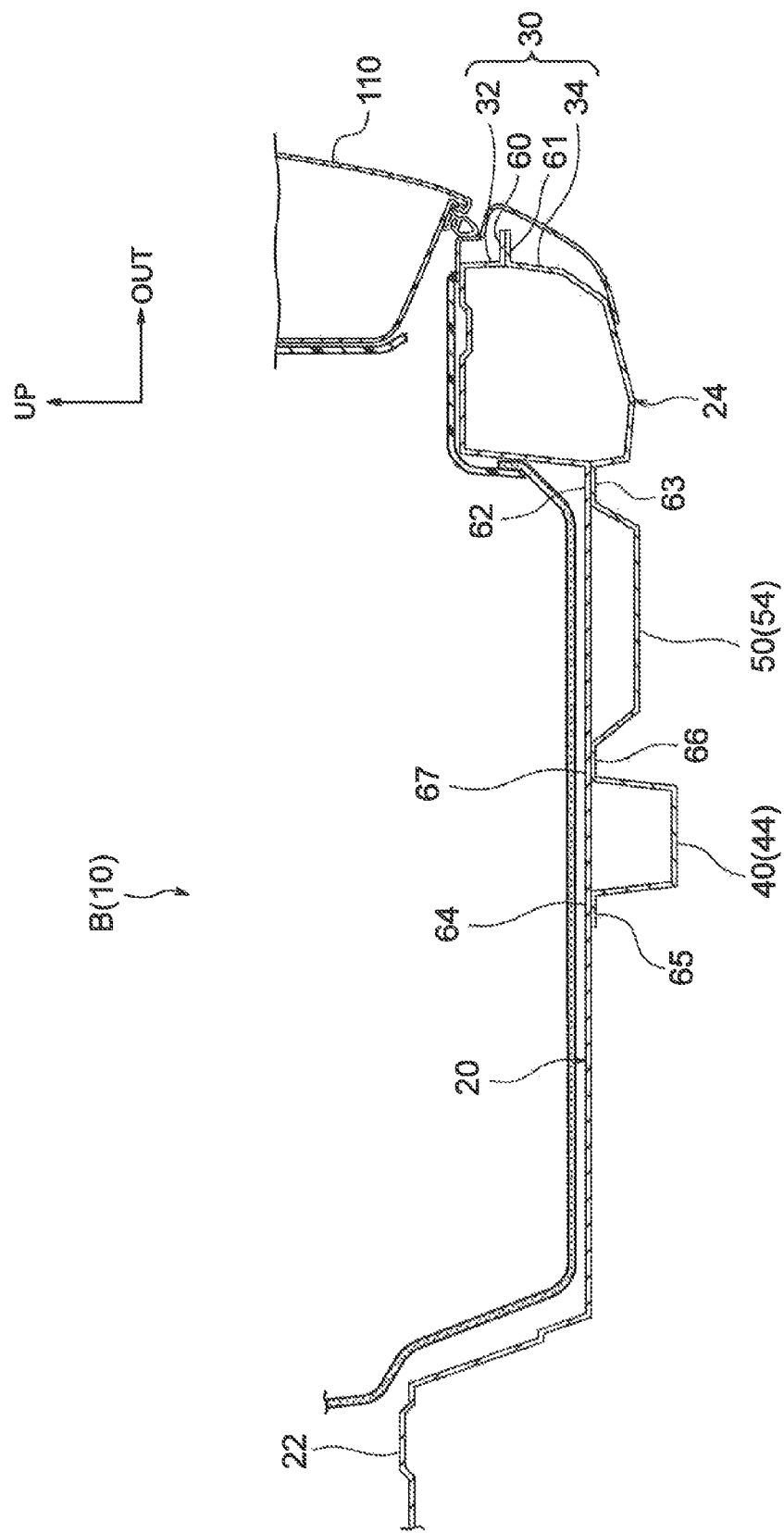
FIG. 6 is a cross-sectional view that corresponds to FIG. 2 and shows a first modified example of the vehicle body structure relating to the embodiment of the present invention.

In the above-described embodiment of the present invention, the floor reinforcement upper 42 and the intermediate reinforcement upper 52 are formed integrally with the floor panel upper 20. However, as shown in FIG. 6, the portion, at the floor panel upper 20, between the tunnel portion 22 and the rocker 30 may be formed in a flat-plate shape.

Namely, the floor reinforcement 40 and the intermediate reinforcement 50 may be structured so as to have only the floor reinforcement lower 44 and the intermediate reinforcement lower 54, respectively.

Figure 7:
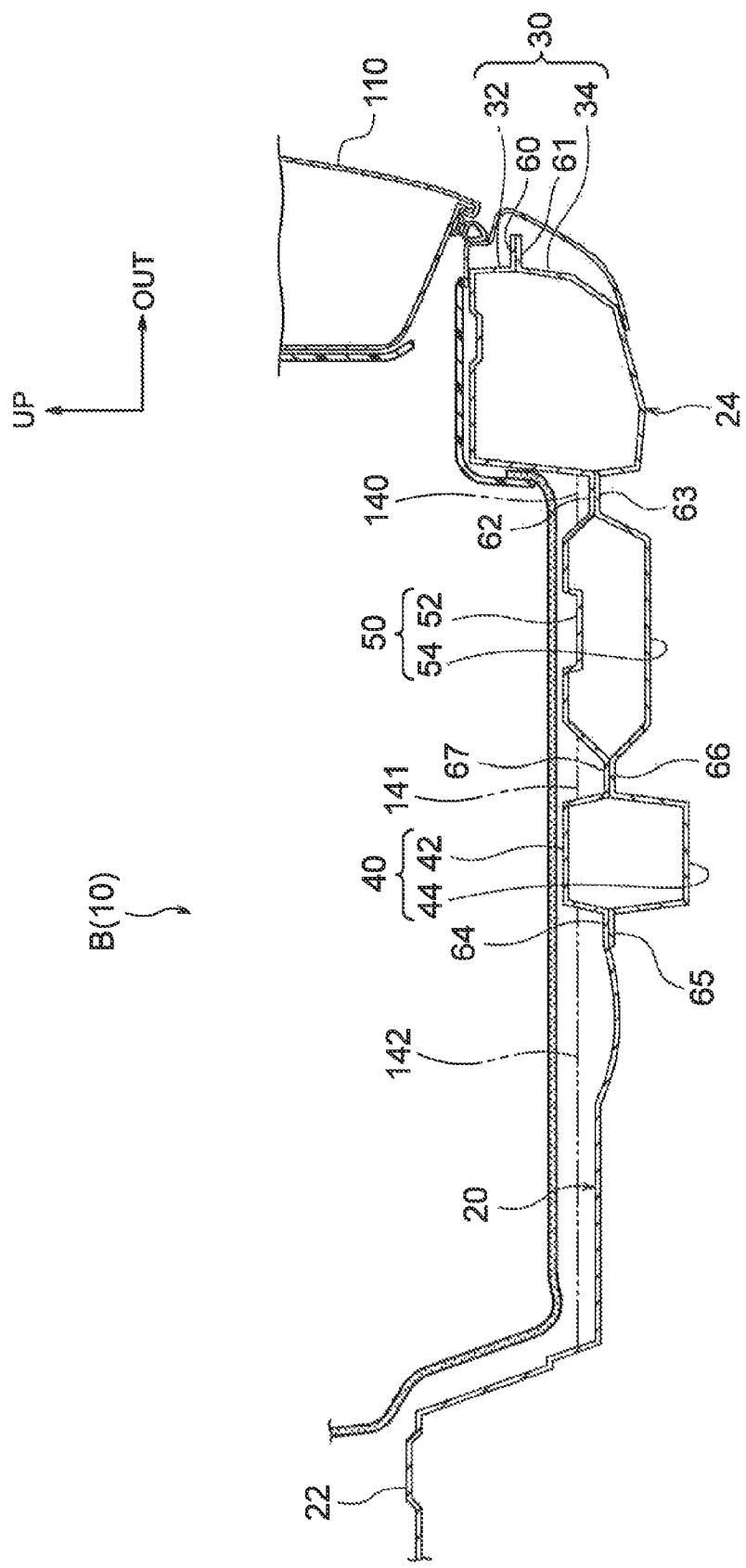
FIG. 7 is a cross-sectional view that corresponds to FIG. 2 and shows a second modified example of the vehicle body structure relating to the embodiment of the present invention.

Further, in the above-described embodiment of the present invention, the respective spaces between the rocker 30, the intermediate reinforcement 50, the floor reinforcement 40 and the tunnel portion 22 may be connected by plural connecting portions 140, 141, 142 that extend in the vehicle transverse direction, as shown in FIG. 7. These plural connecting portions 140, 141, 142 are formed integrally with the floor panel upper 20, and are convex toward the vehicle upper side.

When structured in this way, the respective connection rigidities of the rocker 30, the intermediate reinforcement 50, the floor reinforcement 40 and the tunnel portion 22 are improved. Therefore, the collision load at the time of an offset collision can be transmitted even more efficiently, and the collision load at the time of a side collision also can be transmitted even more efficiently.

Note that, as shown in FIG. 8, the plural connecting portions 140, 141, 142 may be formed at the floor panel upper 20 and the floor panel lower 24, and may be convex toward the vehicle lower side. Further, these plural connecting portions 140, 141, 142 may be structured by a cross member that is continuous in the vehicle transverse direction. When structured in this way as well, operation and effects that are similar to those described above can be exhibited.

An embodiment of the present invention has been described above. However, the present invention is not limited to the above description and, in addition to the above-description, can of course can be implemented by being modified in various ways within a scope that does not deviate from the gist thereof.

The technical concept, that can be grasped from the above-described embodiment in addition to the inventions recited in the claims, is described next.

Namely, there is a vehicle body structure having: a floor panel that structures a floor portion of a vehicle cabin; a rocker that is provided so as to extend in a vehicle longitudinal direction at a vehicle transverse direction outer side at the floor panel, and whose cross-section cut along a vehicle transverse direction forms a closed cross-sectional shape, and that is structured to have a rocker upper and a rocker lower that are divided in a vehicle vertical direction; a pair of ridge lines that are formed so as to extend in the vehicle longitudinal direction respectively at connected portions of a pair of side wall portions, that are formed at the rocker upper and face one another in the vehicle transverse direction, and an upper wall portion that connects vehicle upper side end portions at the pair of side wall portions; and a pillar that is provided at a vehicle upper side of the rocker so as to extend in the vehicle vertical direction, and whose lower portion is joined to the pair of side wall portions respectively, and that has a pair of ridge lines whose positions in the vehicle transverse direction coincide with those of aforementioned pair of ridge lines.

In accordance with this vehicle body structure, the positions, in the vehicle transverse direction, of the respective pair of ridge lines formed at the rocker upper and the pair of ridge lines formed at the pillar coincide. Namely, the respective pair of ridge lines formed at the rocker upper are continuous with the pair of ridge lines formed at the pillar. Due thereto, the joining rigidity of the pillar to the rocker can be improved.

A reference example is described next.

A vehicle body structure 210, that relates to a reference example shown in FIG. 9, is a structure whose structure is changed as follows with respect to the vehicle body structure 10 of the above-described embodiment of the present invention.

Namely, the above-described intermediate reinforcement lower 54 is structured as a body that is separate from the rocker lower 34 and the floor reinforcement lower 44. Further, a flange portion 220, that extends toward the vehicle transverse direction inner side, is formed at the vehicle transverse direction inner side end portion at the rocker lower 34, and a flange portion 221, that extends toward the vehicle transverse direction outer side, is formed at the vehicle transverse direction outer side end portion at the intermediate reinforcement lower 54.

The flange portion 220 is superposed, from the vehicle lower side, with the flange portion 62, and the flange portion 221 is superposed, from the vehicle lower side, with the flange portion 220. Further, these flange portions 62, 220, 221 are joined together by, for example, spot welding or the like.

Similarly, a flange portion 222, that extends toward the vehicle transverse direction outer side, is formed at the vehicle transverse direction outer side end portion at the floor reinforcement lower 44, and a flange portion 223, that extends toward the vehicle transverse direction inner side, is formed at the vehicle transverse direction inner side end portion at the intermediate reinforcement lower 54.

The flange portion 222 is superposed with the flange portion 67 from the vehicle lower side, and the flange portion 223 is superposed with the flange portion 222 from the vehicle lower side. Further, these flange portions 67, 222, 223 are joined together by, for example, spot welding or the like.

Operation and effects of the reference example are described next.

In accordance with this vehicle body structure 210, the floor reinforcement 40 is provided at the vehicle rear side of the front side member, at a central portion between the rocker 30 and the tunnel portion 22 that is formed at the vehicle transverse direction central portion of the floor panel upper 20. Further, the intermediate reinforcement 50 is provided between the rocker 30 and the floor reinforcement 40.

Accordingly, when an offset collision, in which a collision body collides with one vehicle transverse direction side of the vehicle front surface, arises, the collision load transmitted through the front side member is transmitted to the vehicle rear side through three skeletons that are the rocker 30, the floor reinforcement 40 and the intermediate reinforcement 50, without detouring once toward the vehicle transverse direction inner side. Due thereto, the collision load at the time of an offset collision can be efficiently transmitted, and therefore, the collision performance at the time of an offset collision can be improved.

The technical concept that can be grasped from the above-described reference example is described next.

Namely, there is a vehicle body structure having: a floor panel that structures a floor portion of a vehicle cabin; a rocker that is provided so as to extend in a vehicle longitudinal direction at a vehicle transverse direction outer side at the floor panel, and whose cross-section cut along a vehicle transverse direction forms a closed cross-sectional shape, and that has a rocker upper and a rocker lower that are divided in a vehicle vertical direction; a floor reinforcement that is provided, so as to extend in the vehicle longitudinal direction, at a central portion between the rocker and a tunnel portion that is formed at a vehicle transverse direction central portion of the floor panel, and that is disposed at a vehicle rear side of a front side member provided at a vehicle body front portion; and an intermediate reinforcement that is provided, so as to extend in the vehicle longitudinal direction, between the rocker and the floor reinforcement.

In accordance with this vehicle body structure, the floor reinforcement is provided at the vehicle rear side of the front side member, at the central portion between the rocker and the tunnel portion that is formed at the vehicle transverse direction central portion of the floor panel. Further, the intermediate reinforcement is provided between the rocker and the floor reinforcement.

Accordingly, when an offset collision, in which a collision body collides with one vehicle transverse direction side of the vehicle front surface, arises, the collision load transmitted through the front side member is transmitted to the vehicle rear side through three skeletons that are the rocker, the floor reinforcement and the intermediate reinforcement, without detouring once toward the vehicle transverse direction inner side. Due thereto, the collision load at the time of an offset collision can be efficiently transmitted, and therefore, the collision performance at the time of an offset collision can be improved.

Description of the reference numerals is given hereinafter.
10 vehicle body structure
12 front side member
20 floor panel upper (floor panel)
22 tunnel portion
30 rocker
32 rocker upper
32A, 32B pair of side wall portions at rocker upper
32C upper wall portion at rocker upper
34 rocker lower
40 floor reinforcement
42 floor reinforcement upper
44 floor reinforcement lower
50 intermediate reinforcement
52 intermediate reinforcement upper
54 intermediate reinforcement lower
62 flange portion (vehicle transverse direction outer side end portion at floor panel)
63 flange portion (flange portion that is joined from a vehicle lower side to the vehicle transverse direction outer side end portion at the floor panel)
66 flange portion (flange portion that is formed between the intermediate reinforcement lower and the floor reinforcement lower
72 ridge line (ridge line that is formed at the connected portion of the flange portion and the rocker lower)
73 ridge line (ridge line that is formed at the connected portion of the flange portion and the intermediate reinforcement lower)
80, 81 ridge lines (ridge lines that are formed at the connected portions of the pair of side wall portions and the upper wall portion at the rocker upper)
90 front pillar (pillar)
90A front pillar lower (pillar lower)
90B front pillar upper (pillar upper)
91A, 91B joining pieces (lower portion of pillar)
98 overlapped portion
100, 101 ridge lines (ridge lines of pillar)
110 front door (door)
112 door hinge
120 center pillar (pillar)
120A center pillar lower (pillar lower)
120B center pillar upper (pillar upper)
121A, 121B joining pieces (lower portion of pillar)
128 overlapped portion
130, 131 ridge lines (ridge lines of pillar)
132 door hinge
140, 141, 142 plural connecting portions

The invention claimed is:

1. A vehicle body structure comprising:
   a floor panel that structures a floor portion of a vehicle cabin;
   a rocker that is provided so as to extend in a vehicle longitudinal direction at a vehicle transverse direction outer side of the floor panel, whose cross-section cut along a vehicle transverse direction forms a closed cross-sectional shape, and that has a rocker upper and a rocker lower that are divided in a vehicle vertical direction;
   a floor reinforcement that is provided so as to extend in the vehicle longitudinal direction at a central portion between the rocker and a tunnel portion formed at a vehicle transverse direction central portion of the floor panel, and that is disposed at a vehicle rear side of a front side member provided at a vehicle body front portion; and
   an intermediate reinforcement lower that structures an intermediate reinforcement provided so as to extend in the vehicle longitudinal direction between the rocker and the floor reinforcement, and that is disposed at a vehicle lower side of the floor panel, and that is formed integrally with the rocker lower via a flange portion that is joined, from the vehicle lower side, to a vehicle transverse direction outer side end portion at the floor panel.

2. The vehicle body structure of claim 1, wherein ridge lines that extend in the vehicle longitudinal direction are formed respectively at a connected portion of the flange portion and the rocker lower, and a connected portion of the flange portion and the intermediate reinforcement lower.

3. The vehicle body structure of claim 1, wherein the rocker upper is formed integrally with the vehicle transverse direction outer side end portion at the floor panel.

4. The vehicle body structure of claim 1, wherein
the floor reinforcement has a floor reinforcement upper that is formed integrally with the floor panel, and a floor reinforcement lower that is disposed at the vehicle lower side of the floor panel and whose cross-section cut along the vehicle transverse direction forms a closed cross-sectional shape together with the floor reinforcement upper, and
the intermediate reinforcement lower is formed integrally with the floor reinforcement lower via a flange portion that is formed between the intermediate reinforcement lower and the floor reinforcement lower and that is joined to the floor panel from the vehicle lower side.

5. The vehicle body structure of claim 1, comprising an intermediate reinforcement upper that is formed integrally with the floor panel, and that, together with the intermediate reinforcement lower, structures the intermediate reinforcement whose cross-section cut along the vehicle transverse direction forms a closed cross-sectional shape.

6. The vehicle body structure of claim 1, wherein, among the floor panel, the rocker, the floor reinforcement and the intermediate reinforcement, at least the rocker is formed from a high tensile strength steel plate.

7. The vehicle body structure of claim 1, comprising a plurality of connecting portions that extend in the vehicle transverse direction and that connect respective spaces between the rocker, the intermediate reinforcement, the floor reinforcement and the tunnel portion.

8. The vehicle body structure of claim 1, wherein
the rocker upper has a pair of side wall portions that face one another in the vehicle transverse direction, and an upper wall portion that connects vehicle upper side end portions at the pair of side wall portions, and ridge lines that extend in the vehicle longitudinal direction are respectively formed at connected portions of the pair of side wall portions and the upper wall portion, and
a pillar that extends in the vehicle vertical direction, whose lower portion is joined to the pair of side wall portions respectively, and that has a pair of ridge lines whose positions in the vehicle transverse direction coincide with those of the respective pair of ridge lines formed at the rocker upper, is provided at a vehicle upper side of the rocker.

9. The vehicle body structure of claim 8, wherein
the pillar has a pillar lower, and a pillar upper whose lower end portion is joined to an upper end portion of the pillar lower in a state of being overlapped in the vehicle vertical direction, and
a door hinge, that openably and closably supports a door provided at a side portion of a vehicle, is fixed to an overlapped portion of the pillar lower and the pillar upper.

* * * * *